United States Patent [19]
Lamb

[11] Patent Number: 6,157,831
[45] Date of Patent: *Dec. 5, 2000

[54] METHOD AND APPARATUS FOR IMPLEMENTING CONFIGURABLE CALL FORWARDING BINS IN A MOBILE TELEPHONE SYSTEM

[75] Inventor: James A. Lamb, Elkhorn, Nebr.

[73] Assignee: Compaq Computer Corp., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,261

[22] Filed: Jan. 11, 1997

[51] Int. Cl.$^7$ ...................................................... H04Q 7/20
[52] U.S. Cl. ......................................... 455/433; 455/417
[58] Field of Search ..................................... 455/414, 417, 455/445, 432, 436, 433; 379/210, 211, 212

[56] References Cited

U.S. PATENT DOCUMENTS

| | | | |
|---|---|---|---|
| 4,799,061 | 1/1989 | Abraham et al. | 340/825.24 |
| 4,930,150 | 5/1990 | Katz | 379/93 |
| 5,014,298 | 5/1991 | Katz | 379/93 |
| 5,048,075 | 9/1991 | Katz | 379/92 |
| 5,128,984 | 7/1992 | Katz | 379/92 |

(List continued on next page.)

FOREIGN PATENT DOCUMENTS

| | | |
|---|---|---|
| WO 93 11646 | 6/1993 | European Pat. Off. ......... H04Q 7/04 |
| 0 613 280 A1 | 8/1994 | European Pat. Off. . |
| 0 715 475 A2 | 6/1996 | European Pat. Off. . |
| 0 738 095 A2 | 10/1996 | European Pat. Off. . |
| 196 17 798 A1 | 11/1997 | Germany . |

(List continued on next page.)

OTHER PUBLICATIONS

Articles by K. A. Holley entitled, "Global System For Mobile Communications—What's In Store?", published BT Technology Journal, vol. 14, No. 31, Jul. 1, 1996, pp. 47–54.

(List continued on next page.)

*Primary Examiner*—Nguyen Vo
*Attorney, Agent, or Firm*—Fenwick & West LLP

[57] ABSTRACT

The present invention provides an improved home location register (HLR) that includes an application program for implementing configurable call forwarding bins in a mobile telephone system. According to the invention, a number of call forwarding bins are provided for subscribers. Each forwarding bin must be individually authorized to become available to a subscriber. Furthermore, if a bin is authorized, depending on whether a bin is locked or not, either the cellular carrier or the subscriber can activate the bin and/or modify a forward-to number in the bin. Moreover, a priority list is provided, corresponding to a particular status of the subscriber's cellular phone. (i.e. busy, no answer, etc.) and whether the subscriber is in the home area or a roaming area. The priority list identifies selected bin numbers that the application program needs to check. The bin that has the highest priority on the list and is authorized and activated will be selected. The forward-to number in that bin will be used for call forwarding. If none of the bins in the priority list is authorized and activated, a switch default number is used to redirect incoming calls, so that an announcement will be played to calling parties. Therefore, by using the improved HLR of the invention, more call forwarding bins-can be implemented. Moreover, these bins can be easily configured in desired ways to allow either a cellular carrier or a subscriber to control the use of selected bins. Additionally, in providing call forwarding services, a plurality of bins are checked to find an appropriate forward-to number, thus avoiding sending erroneous messages to calling parties.

11 Claims, 10 Drawing Sheets

U.S. PATENT DOCUMENTS

| | | |
|---|---|---|
| 5,210,787 | 5/1993 | Hayes et al. .................. 455/432 X |
| 5,243,645 | 9/1993 | Bissell et la. .................. 379/211 |
| 5,371,781 | 12/1994 | Ardon .................. 455/445 |
| 5,406,619 | 4/1995 | Akhteruzzaman et al. .................. 379/95 |
| 5,418,835 | 5/1995 | Frohman et al. .................. 455/413 |
| 5,448,622 | 9/1995 | Huttunen .................. 455/567 X |
| 5,455,863 | 10/1995 | Brown et al. .................. 380/23 |
| 5,504,804 | 4/1996 | Widmark et al. .................. 455/414 |
| 5,530,736 | 6/1996 | Comer et al. .................. 45/567 X |
| 5,533,107 | 7/1996 | Irwin et al. .................. 379/201 |
| 5,553,120 | 9/1996 | Katz .................. 379/88 |
| 5,577,103 | 11/1996 | Foti .................. 455/414 |
| 5,590,175 | 12/1996 | Gallant et al. .................. 379/58 |
| 5,592,541 | 1/1997 | Fleischer, III et al. .................. 379/211 |
| 5,600,704 | 2/1997 | Ahlberg et al. .................. 379/58 |
| 5,673,308 | 9/1997 | Akhavan .................. 455/417 |
| 5,708,710 | 1/1998 | Duda .................. 380/21 |
| 5,724,417 | 3/1998 | Bartholomew et al. .................. 379/211 |
| 5,727,057 | 3/1998 | Emery et al. .................. 455/456 |
| 5,793,859 | 8/1998 | Matthews .................. 455/417 X |
| 5,794,142 | 8/1998 | Vanttila et al. .................. 455/419 |
| 5,822,691 | 10/1998 | Hosseini .................. 455/410 |
| 5,875,394 | 2/1999 | Daly et al. .................. 455/411 |
| 5,878,126 | 3/1999 | Velamuri et al. .................. 379/219 |
| 5,887,251 | 3/1999 | Fehnel .................. 455/411 |
| 5,937,068 | 8/1999 | Audebert .................. 380/23 |
| 5,943,425 | 8/1999 | Mizikovsky .................. 380/25 |

FOREIGN PATENT DOCUMENTS

| | | |
|---|---|---|
| WO 93/21715 | 10/1993 | WIPO . |
| WO 94/06236 | 3/1994 | WIPO . |
| 94 29992 | 12/1994 | WIPO . |
| WO 96/07286 | 3/1996 | WIPO . |
| 98 05173 | 2/1998 | WIPO . |
| WO 98/26620 | 6/1998 | WIPO . |

OTHER PUBLICATIONS

Article by Wey, Jyhi–Kong et al., "Clone Terminator: An Authentication Service for Advanced Mobile Phone System," Institute of Electrical and Electronics Engineers Conference: Vehicular Technology, Chicago, Jul. 25–28, 1995, vol. 1, No. CONF. 45, Jul. 25, 1995, pp. 175–179.

Article by Kaczmarek, Keith W., "Cellular Networking: A Carrier's Perspective," Institute of Electrical and Electronics Conference: Gateway to New Concepts in Vehicular Technology, San Francisco, May 1–3, 1989,, vol. 1, No. CONF. 39, May 1, 1989, pp. 1–6.

L. Rydin et al, "Network and Service Evolution in Fixed and Mobile Networks" proceedings of the International Switching Symposium, Yokohama, Oct. 25–30, 1992, vol. 1, No. SYMP. 14, Oct. 25, 1992, pp. 54–58, Institute of Electronics; Information and Communication Engineers.

Eleftheriadis G. P. et al. "User Profile Identification In Future Mobile Telecommunications Systems" IEEE Network: The Magazine Of Computer Communications; vol. 8, No. 5 Sep. 1994, pp. 33–39.

SUBS FILE RECORD

| BASE _ REC _ INFO |
| --- |
| R _ MIN _ KEY |
| ESN |
| ⋮ |
| SHARED _ INFO |
| HOME _ MSCID |
| SHARED _ ACCESS _ MAP |
| ⋮ |
| AUTH _ ENABLED |
| ⋮ |
| TRANSIENT _ INFO |
| VLR _ MSCID |
| REG _ STATUS _ IND |
| FRAUD _ INFO |
| PIN _ INFO |
| BIN0 _ INFO |
| BIN1 _ INFO |
| ⋮ |

FIG. 4

| BIN | LABEL | AUTHORIZED | LOCK | ACTIVE | FORWARD - TO NO |
|---|---|---|---|---|---|
| 0 | CFU | Y, N | N, Y, A, F | Y, N | n0 |
| 1 | CFB | Y, N | N, Y, A, F | Y, N | n1 |
| 2 | CFNA | Y, N | N, Y, A, F | Y, N | n2 |
| 3 | CFNRI | Y, N | N, Y, A, F | Y, N | n3 |
| 4 | CFDND | Y, N | N, Y, A, F | Y, N | n4 |
| 5 | CFD | Y, N | N, Y, A, F | Y, N | n5 |
| 6 | CFX1 | Y, N | N, Y, A, F | Y, N | n6 |
| 7 | CFX2 | Y, N | N, Y, A, F | Y, N | n7 |
| 8 | CFX3 | Y, N | N, Y, A, F | Y, N | n8 |
| 9 | CFX4 | Y, N | N, Y, A, F | Y, N | n9 |

FIG. 5

| LOCK Value | Can the Subscriber Change the Bin's Activate Flag | Can the Subscriber Change the Bin's Call Forward - to - No? |
|---|---|---|
| NO (Default) | Yes | Yes |
| Yes | No | No |
| Allow | No | Yes |
| Forward - To | Yes | No |

FIG. 6

PRIORITY LISTS FOR CFB BIN

| HOME PRIORITY LIST | ROAMING PRIORITY LIST |
|---|---|
| BIN 1 | BIN 1 |
| BIN 2 | BIN 2 |
| BIN 0 | BIN 5 |
| BIN 4 | |
| BIN 5 | |

METHOD AND APPARATUS FOR IMPLEMENTING CONFIGURABLE CALL FORWARDING BINS IN A MOBILE TELEPHONE SYSTEM

RELATED APPLICATIONS

The following applications are related to the subject application. Each of the following applications is incorporated by reference herein.
1. U.S. application Ser. No. 08/781,262 entitled "Method and Apparatus for Providing Switch Capability Mediation in a Mobile Telephone System," of Lamb et al., filed Jan. 11, 1997;
2. U.S. application Ser. No. 08/781,264 entitled "Method and Apparatus for Providing Fraud Protection Mediation in a Mobile Telephone System," of Lamb, filed Jan. 11, 1997;
3. U.S. application Ser. No. 08/781,259 entitled "Method and Apparatus or Implementing Alias Mobile ID Numbers in a Mobile Telephone System," of Lamb, filed Jan. 11, 1997;
4. U.S. application Ser. No. 08/781,260 entitled "Method and Apparatus for Method and Apparatus For Automated Updates on an A-Key Entry In a Mobile Telephone System," of Jacobs, filed Jan. 11, 1997;
5. U.S. application Ser. No. 08/780,830 entitled "Method and Apparatus for Configuration of Authentication Center Operations Allowed by MSCID in a Mobile Telephone System," of Jacobs et al., filed Jan. 11, 1997;
6. U.S. application Ser. No. 08/781,258 entitled "Method and Apparatus for Configuration of Authentication Center Operations Allowed by System Access Type in a Mobile Telephone System," of Jacobs, filed Jan. 11, 1997;
7. U.S. application Ser. No. 08/781,263 entitled "Method and Apparatus for Authentication Directive initiation Limits in a Mobile Telephone System," of Jacobs, filed Jan. 11, 1997.

BACKGROUND OF THE INVENTION

The invention generally relates to a wireless communication network, and more particularly, relates to an improved home location register (HLR) that implements configurable call forwarding bins in a wireless communication network.

Wireless communication is one of the fastest growing segments of the telecommunication industry. With the mobility of the wireless devices, such as cellular phones and pagers, a subscriber to a wireless service can make or receive a call or receive a message without being restricted to any particular locations. Because of the convenience provided by wireless devices, they have been widely used by average consumers.

Wireless communications are provided through a wireless communication network, which can be realized, for example, as a Signaling System 7 (SS7) network. The SS7 network uses the EIA/TIA Interim Standard 41 (IS-41) protocol, which is the standard commonly used in North America. A description of the SS7 network and the IS-41 protocol can be found in *Signaling System #7*, by Travis Russell, and *The Mobile Communications Handbook*, by Jerry Gibson, which are hereby incorporated by reference.

The SS7 network is used for switching data messages pertaining to connecting telephone calls and for maintaining the signaling network. As shown in FIG. 1, the SS7 network 100 has three different types of nodes or signaling points: Service Switching Point (SSP) 112, Signal Transfer Point (STP) 116, and Service Control Point (SCP) 122.

An SSP 112 is a local exchange in the telephone network. An SSP 112 uses the information provided by the calling party (such as dialed digits) and determines how to connect the call. An STP 116 serves as a router in the SS7 network and switches SS7 messages as received from the various SSPs 112 through the network to their appropriate destinations. An STP 116 receives messages in packet form from an SSP 112. These packets are either related to call connections or database queries for an SCP 122. If the packet is a request from an SSP 112 to connect a call, the message must be forwarded to the destination where the call will be terminated. The destination is determined by the dialed digits. If the message is a database query seeking additional information regarding a person who subscribes a wireless service, i.e., a "subscriber", the destination will be a database. Access to telephone company databases is provided through an SCP 122. These databases are used to store information about subscribers' services, calling card validation, fraud protection, etc.

As shown in FIG. 1, the wireless network is shared by multiple regions 126, such as regions A and B. In each region 126, an SCP 122 is provided. Each region 126 is further divided into a number of registration areas 132, each of which is served by a Mobile Switching Center (MSC) 136. An MSC 136 provides wireless communication services to all properly registered cellular phones 142 in the registration area.

As illustrated in FIG. 1, an SCP 122 contains an authentication center (AC) 146, a home location register (HLR) 152 and a Visitor Location Register (VLR) 156. AC 146 authenticates a subscriber's cellular phone through the use of an encrypted number called the A-Key. HLR 152 is used to store information regarding cellular subscribers in the region for which it provides services. HLR 152 also stores information identifying the services allowed for each subscriber. In addition to these, HLR 152 stores the current locations of cellular phones 142 of those subscriber's who initially activated their cellular phones through a wireless service provider in the region the HLR serves. This region is also referred to as the "home area" of those subscribers. Although not shown, a backup HLR is also provided in SCP 122. VLR 156 is used when a cellular phone 142 is not recognized by a local MSC. VLR 156 stores the current locations for the visiting subscribers.

With the convenience and wide use of cellular phones, subscribers have desired more features to be included in their cellular phones such as those available on regular telephones. For example, their cellular phones should be programmable to have incoming calls automatically redirected to another number, such as a voice mail number, in different situations.

Call forwarding bins have been implemented to accommodate the needs of the subscribers. Conventionally, four separate bins have been provided for CFU (Call Forwarding—Unconditional), CFB (Call Forwarding—Busy), CFNA (Call Forwarding—No Answer), and CFD (Call Forwarding—Default). For example, if a subscriber is engaged in a call and the CFB bin is active, all incoming calls will be redirected to the forward-to number from the CFB bin. However, if the CFB bin is inactive, a switch default number is used to redirect incoming calls, so that an announcement such as "The number you have dialed is invalid, please check your number" will be played to the calling party. Thus, in using conventional HLRs, an erroneous message could be sent to a calling party, even though he has dialed a valid phone number. This is because a particular call forwarding bin is not activated for the receiving party, even though other call forwarding bins may be active for the receiving party.

Thus, there is a need for implementing call forwarding bins so that a number of bins are checked to determine which one is active. The forwarding-to number in the active bin that has the highest priority may be used for call forwarding. Furthermore, it is desirable for a cellular carrier to configure various bins so that either the cellular carrier or subscriber can modify information, such as the forward-to numbers, in selected bins.

SUMMARY OF THE INVENTION

The present invention provides an improved home location register (HLR) that includes an application program for implementing configurable call forwarding bins in a mobile telephone system. According to the invention, a number of call forwarding bins are provided for subscribers. Each forwarding bin must be individually authorized to become available to a subscriber. Furthermore, if a bin is authorized, depending on whether a bin is locked or not, either the cellular carrier or the subscriber can activate the bin and/or modify a forward-to number in the bin. Moreover, a priority list is provided, corresponding to a particular status of the subscriber's cellular phone (i.e. busy, no answer, etc.) and whether the subscriber is in the home area or a roaming area. The priority list identifies selected bin numbers that the application program needs to check. The bin that has the highest priority on the list and is authorized and activated will be selected. The forward-to number in t hat bin will be used for call forwarding. If none of the bins in the priority list is authorized and activated, a switch default number is used to redirect incoming calls, so that an announcement will be played to calling parties.

Therefore, by using the improved HLR of the invention, more call forwarding bins can be implemented. Moreover, these bins can be easily configured in desired ways to allow either a cellular carrier or a subscriber to control the use of selected bins. Additionally, in providing call forwarding services, a plurality of bins are checked to find an appropriate forward-to number, thus avoiding sending erroneous messages to calling parties.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 shows a partial format of a subscriber's profile record in a SUBS file of an HLR according to the invention;

FIG. 5 shows an example of configurable call forwarding bins in a subscriber's profile record according to the invention;

FIG. 6 shows a table illustrating how the LOCK value in a call forwarding bin controls an authorized subscriber's use of the bin according to the invention;

FIG. 8 shows examples of priority lists of call forwarding bins according to the invention

DETAILED DESCRIPTION OF THE PREFERRED EMBODIMENTS

Figure 2:
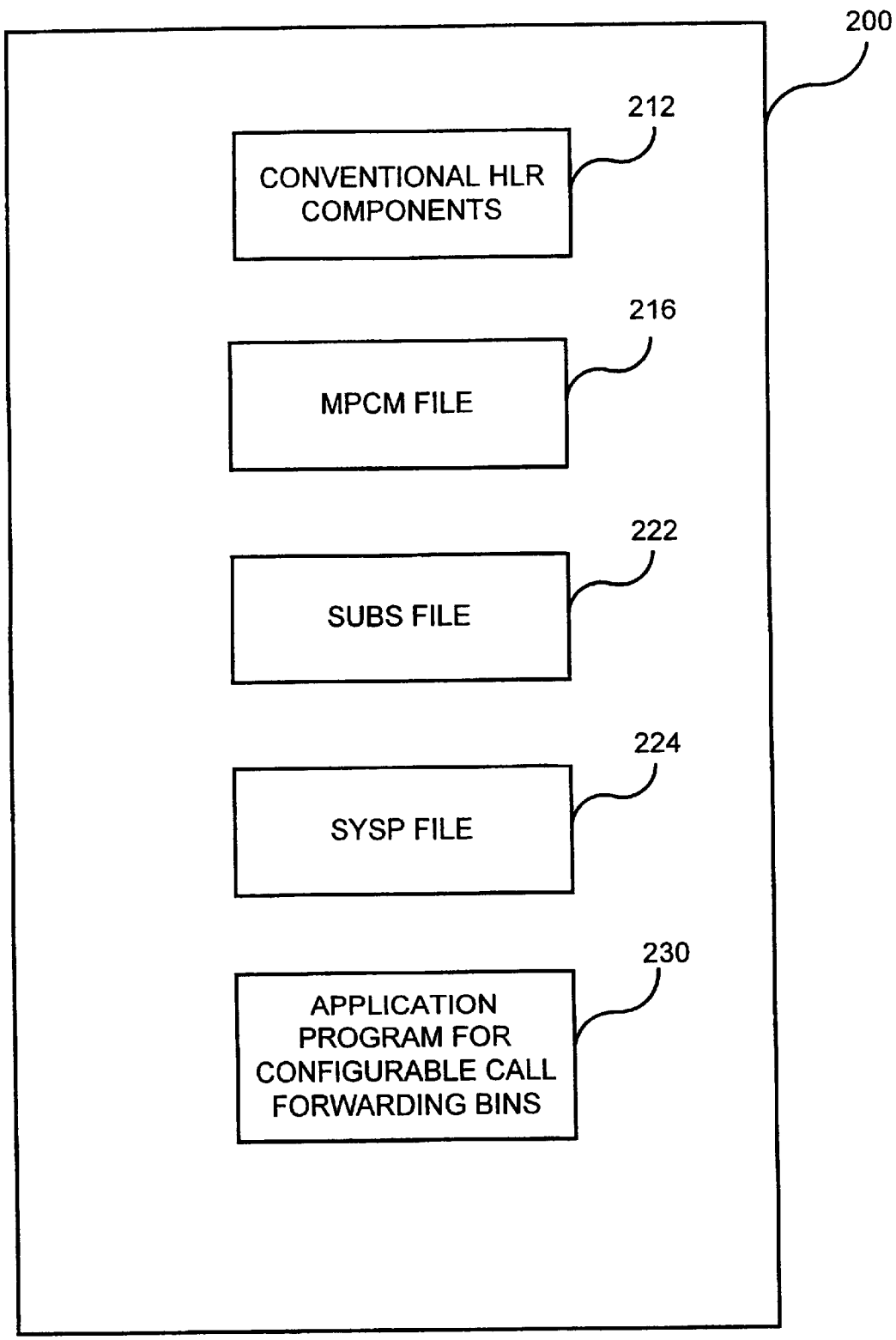
FIG. 2 shows an example of an HLR according to the invention.

FIG. 2 shows home location register (HLR) 200 according to the invention. As shown, HLR 200 includes at least conventional HLR components 212, MPCM file 216, SUBS file 222, SYSP file 224, and application program 230 for configurable call forwarding bins.

MPCM file 216 is the "MSC ID Point Code Map File" which store MSCs' network configuration information. Each MSC connected to an HLR has a corresponding MPCM file record in the MPCM file of the HLR. SUBS file 222 is the "subscribers' files" which store subscribers' profiles on a per subscriber basis (i.e, information for each cellular phone). Usually one SUBS file in the HLR contains information about all of its home subscribers (i.e., the subscribers who initially activated their cellular phones in the region the HLR serves). SYSP file 224 is the "System Parameters File" which stores global information about how the system should operate. Application program 230 is a software program that configures and implements call forwarding bins for subscribers. It will be understood by persons of ordinary skill in the art that functions performed by the HLR are implemented by a processor executing computer instructions stored in a memory.

Figure 3:
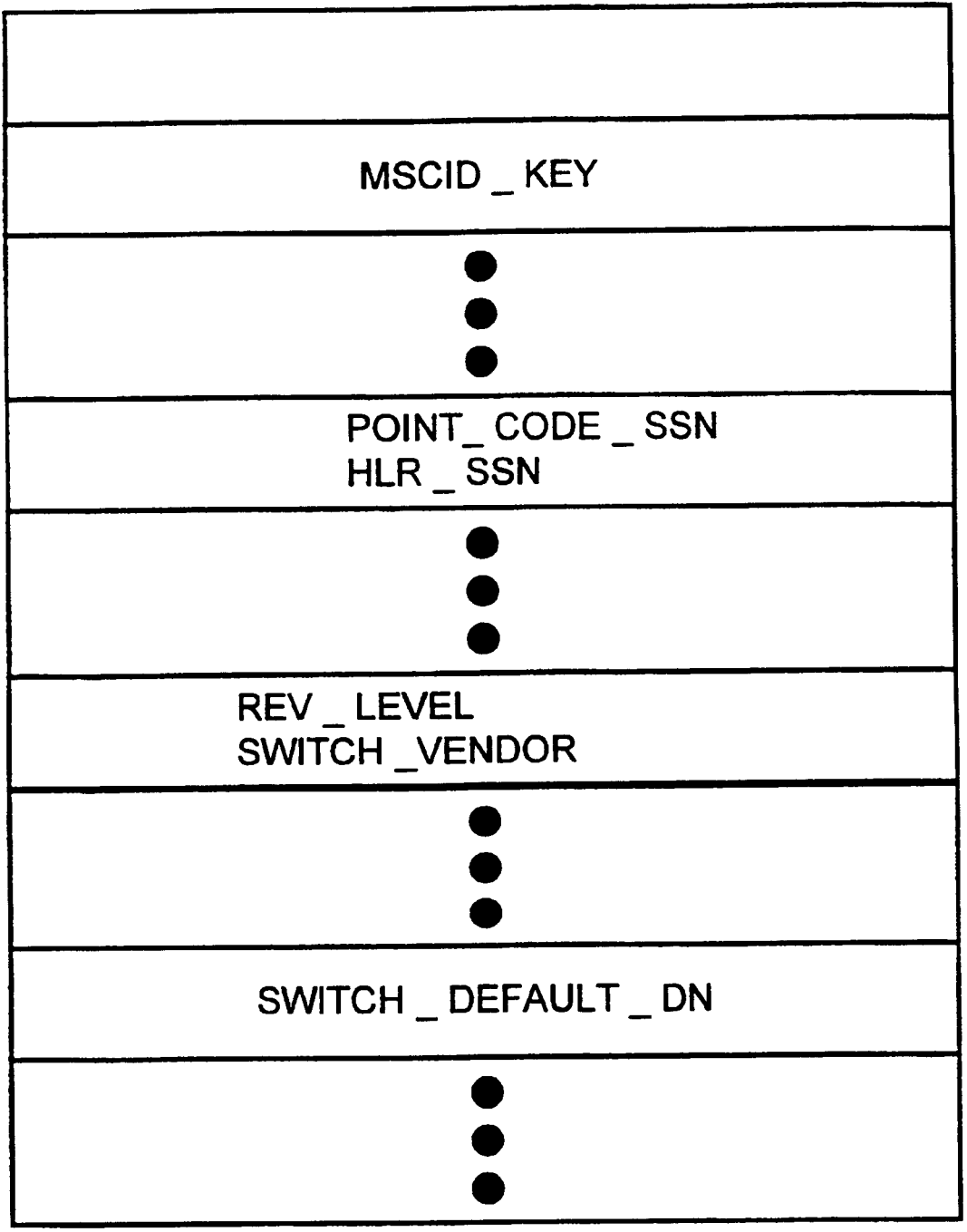
FIG. 3 shows an MPCM file record of an MSC according to the invention.

FIG. 3 illustrates a partial format of an MPCM file record associated with an MSC in MPCM file 216. This file record includes a number of fields. Some of the relevant fields are described below. The MSCID_KEY field identifies this MSC's ID (MSCID) number. It is the primary key to the MPCM files. The POINT_CODE_SSN field identifies the network ID and subsystem (SSN), etc. for this MSC. The HLR_SSN field stores the value the HLR will use as the SSN when communicating with this MSC. The IS-41 revision level of this MSC, e.g., IS-41 Rev A, IS-41 Rev B, etc, is stored in the REV_LEVEL field. Moreover, the vendor of this MSC, e.g., AT&T, Ericsson, Motorola, or Northern Telecom, etc. is identified by SWITCH_VENDOR field. Also, in the MPCM file record, the DEFAULT_SWITCH_DN field defines the default directory number for use when none of the call forwarding bins are available for a subscriber this MSC currently serves.

FIG. 4 shows a partial format of a subscriber's profile record in SUBS file 222. There are several segments each subscriber's profile record, including the BASE_REC_INFO, SHARED_INFO, TRANSIENT_INFO, etc. Each segment includes multiple fields. The BASE_REC_INFO segment contains information needed by IS-41 applications to access a subscriber record. This segment includes the R_MIN_KEY, ESN fields, etc. The R_MIN_KEY field is the subscriber file's primary key. It contains the subscriber's MIN (Mobile ID number) stored in reverse byte order. The ESN field is the subscriber file's alternate key. It contains the Equipment Serial Number (ESN) associated with the subscriber's MIN.

The SHARED_INFO segment of a subscriber's profile record identifies the IS-41 applications currently accessing the subscriber's data. This segment includes the HOME_MSCID, SHARED_ACCESS_MAP, AUTH_ENABLED fields, etc. The HOME_MSCID field identifies the ID number of the MSC in the subscriber's home area where the subscriber initially activates his cellular phone. The SHARED_ACCESS_MAP field is a bitmap identifying the IS-41 applications currently accessing the subscriber's data. The AUTH_ENABLED field identifies whether or not authentication is enabled and should be performed for this subscriber.

The TRANSIENT_INFO segment of a subscriber's profile record stores the registration information about this subscriber. This segment includes the VLR_MSCID, REG_STATUS_IND fields, etc. The VLR_MSCID field identifies the MSCID of the VLR in a roaming area where the subscriber is currently registered. The REG_STATUS_IND field identifies the subscriber's registration status. This field stores the information relating to, e.g., whether the subscriber is registered, whether registration is active in the home area, and whether the registration is active in the roaming area.

The FRAUD_INFO segment of a subscriber's profile record indicates whether or not fraud protection, i.e., FP check is authorized for this subscriber. The PIN_INFO segment stores the subscriber's personal identification number (PIN).

Each of the BIN0_INFO to BIN9_INFO segments of a subscriber's profile record contains information about whether the bin is authorized, whether the bin is activated, whether the activation of the bin is locked, whether the forward-to number of the bin is locked, and the forward to number of this bin. The call forwarding feature of each bin is stored in the SYSP file of the HLR as will be described below.

FIG. 5 shows call forwarding bins of an HLR configured for a particular subscriber. The functions of each call forwarding bin is configured on a system-wide basis for all subscribers served by the HLR. All of the fields in a call forwarding bin, except the LABEL field, are in the respective BIN0_INFO to BIN9_INFO segments in a subscriber's profile record. The LABEL field identifies the call forwarding feature of a bin and is in the SYSP file of the HLR. In FIG. 5, the BIN field indicates a bin number. The AUTHORIZED field indicates whether a particular bin is authorized for a subscriber. The AUTHORIZED field may be set to Y (Yes) or N (No) by the cellular carrier. Each bin must be individually authorized (i.e., the AUTHORIZED field must be set to Y) in order to be used. Depending on the particular services a subscriber selects, one or more bins may be authorized for this subscriber. The LOCK field functions to control a subscriber's use of the ACTIVE and FORWARD-TO_NUMBER fields if the bin is authorized for the subscriber (i.e., the AUTHORIZED field is set to Y). The LOCK field can be set to any one of N (No), Y (Yes), A (Allow), or F (Forward-to), as will be described below in connection with FIG. 6. The ACTIVE field may be set to Y (Yes) or N (No), by either the subscriber or the cellular carrier as controlled by the LOCK value of the bin. The FORWARD-TO_NUMBER field contains the forward-to numbers, e.g., n0 to n9 for bin 0 to bin 9, respectively. These forward-to numbers can be modified by either the subscriber or the cellular carrier as controlled by the LOCK value of the bin.

In the example shown in FIG. 5, bin 0 is configured to implement CFU (Call Forwarding—Unconditional). This capability enables a subscriber to have all incoming calls destined for the subscriber's cellular number to be redirected to another telephone number n0. When bin 0 is authorized for the subscriber (i.e., the AUTHORIZED field is Y) and this capability is activated (i.e., the ACTIVE field is Y), calls are forwarded to telephone number n0 regardless of the status of the subscriber's cellular phone (i.e., regardless of whether the cellular phone is on or off). Bin 1 is configured to implement CFB (Call Forwarding—Busy). When bin 1 is authorized and activated, this capability enables a subscriber to have incoming call destined for the subscriber's cellular number to be redirected to another telephone number n1 when the subscriber is engaged in a call. Bin 2 is configured to implement CFNA (Call Forwarding—No Answer). When bin 2 is authorized and activated, this capability enables a subscriber to have incoming calls destined for the subscriber's cellular number to be redirected to telephone number n2 when the subscriber does not answer the phone. Bin 3 is configured to implement CFNRI (Call Forwarding—Not Registered/Inactive). When bin 3 is authorized and activated, this capability enables a subscriber to have incoming calls destined for his cellular number to be redirected to telephone number n3 when the cellular phone does not respond to a page (i.e., when calls cannot be presented because the subscriber is not currently registered or is inactive). Bin 4 is configured to implement CFDND (Call Forwarding—Do Not Disturb). When bin 4 is authorized and activated, this capability allows a subscriber to direct incoming calls to telephone number n4. Bin 5 is configured to implement CFD (Call Forwarding—Default). When this bin is authorized and activated, this capability provides a common destination—telephone number n5—for incoming calls destined for the subscriber's cellular number which cannot be delivered. The main reason for using CFD is to ensure all non-completed calls are redirected appropriately (typically to voice mail). Bin 6 to bin 9 may be configured to implement other call forwarding features, e.g., CFX1 to CFX4 (arbitrary feature names) respectively, by the cellular carrier.

FIG. 6 shows a table illustrating how the LOCK value controls whether an authorized subscriber can activate or deactivate a bin by changing the value in the ACTIVE field and whether the subscriber can change the forward-to number in the FORWARD-TO_NUMBER field of the bin. If the LOCK value is set to N (No) for a bin, which is a default value, the subscriber can both activate and deactivate the bin and change the forward-to number in the bin. If the LOCK value is Y (Yes), the subscriber cannot activate or deactivate the bin or change the forward-to number in the bin. If the LOCK value is A (Allow), the subscriber cannot activate or deactivate the bin but can change the forward-to number. Finally, if the LOCK value is F (Forward-to), the subscriber can activate or deactivate the bin but cannot change the forward-to number in the bin.

The LOCK value is set by the cellular carrier. If, for example, a subscriber has not paid the telephone bill, the cellular carrier may set the LOCK value to Y for the CFU bin and modify the forward-to number to a specific number. In this way, when someone calls the subscriber, the call is redirected to the specific number and a message is played from an audio unit in an MSC, informing the calling party, for example, "The number you have dialed is no longer in service."

Figure 7:
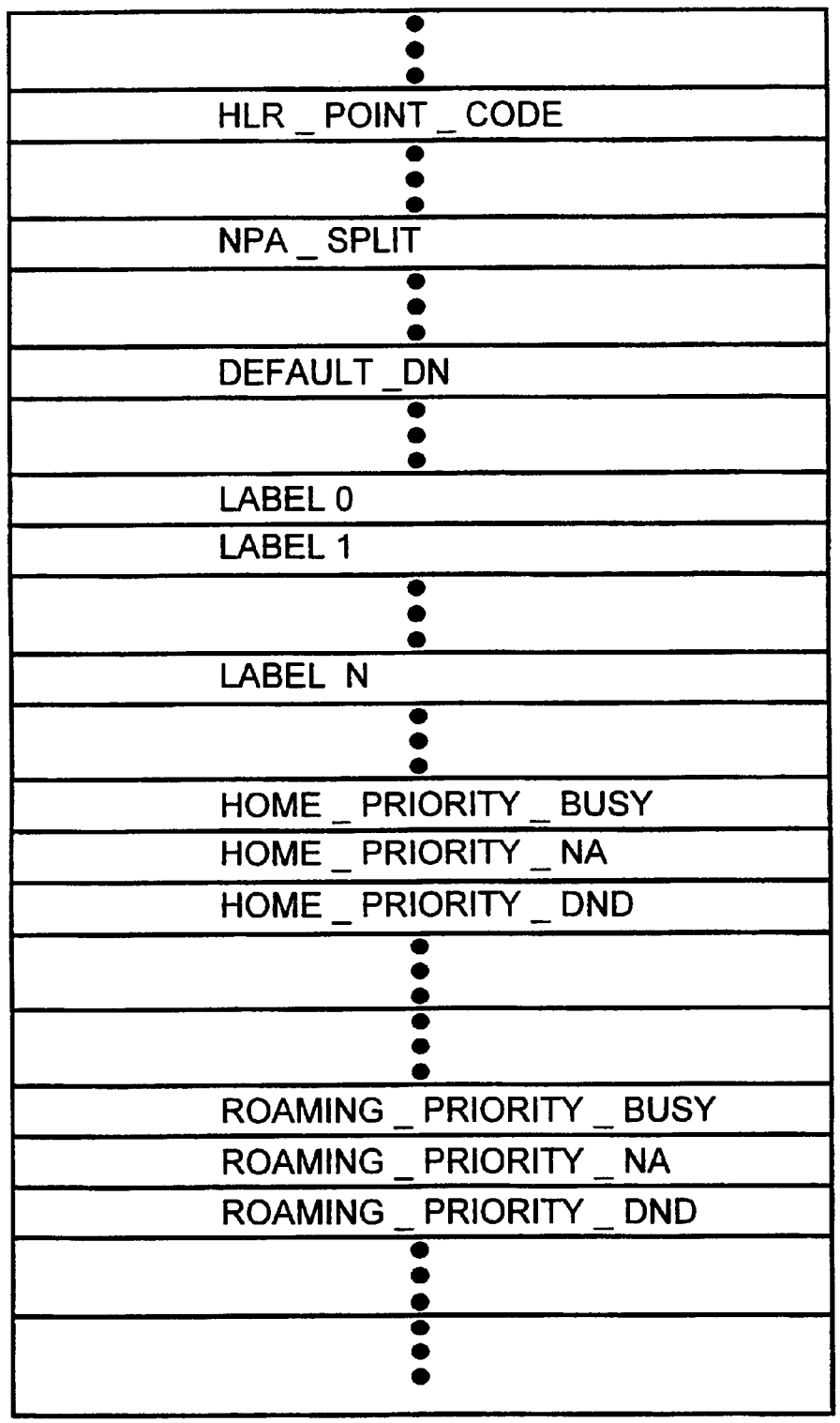
FIG. 7 shows a partial format of a SYSP file of an HLR according to the invention.

FIG. 7 shows a partial format of SYSP file 224 of the HLR. The SYSP file stores the global information about how the HLR should operate. It includes a number of fields. The HLR_POINT_CODE field identifies the network address (i.e., the point code) of the HLR. The NPA_SPLIT field indicates whether the HLR supports the area code split logic when an area code is split into two different area codes because of number capacity problems. This feature allows the HLR to provide the translation of old numbers to new numbers. The LABEL0, LABEL1, . . . and LABELN fields store call forwarding features for bin 0, bin 1, . . . and bin N, respectively. In a preferred embodiment of the invention, ten call forwarding bins are implemented and ten associated labels are stored in the LABEL0 to LABEL9 fields respectively, of the SYSP file. The HOME_PRIORITY_ BUSY, HOME_PRIORITY_NA, HOME_PRIORITY_ DND, etc. fields contain the priority lists for the CFB bin, CFNA bin, CFDND bin etc., respectively, for use when the subscribers is in the home area. A priority list is one that includes a number of bin numbers arranged from the highest priority to the lowest priority. The HLR uses the priority lists for call forwarding purposes, as will be described in detail below. Similarly, the ROAMING_PRIORITY_BUSY, ROARMING_PRIORITY_NA, ROAMING_ PRIORITY_DND, etc. fields contain the priority lists for the CFB bin, CFNA bin, and CFDND bin, respectively, for use when the subscriber is in a roaming area. The priority lists are defined by the cellular carrier for all subscribers.

Depending on whether a subscriber is in the home area or a roaming area, a home priority list or roaming list will be used by the HLR. To provide call forwarding services, application program 230 of the HLR will check the appropriate priority list based on the status of the subscriber's cellular phone, e.g., whether the subscriber is busy, does not answer, or is unregistered/inactive, etc. For example, if the subscriber is in the home area and is currently busy when an incoming call is destined for his cellular number, application program 230 will check the home priority list associated with the busy status, e.g., the priority list stored in the HOME_PRIORITY_BUSY in the SYSP file.

Examples of priority lists are shown in FIG. 8. The priority list in FIG. 8 are for the CFB bin. Assume the call forwarding bin structure of FIG. 5 is implemented in this example. Thus, bin 1 corresponds to the CFB bin. In providing call forwarding services, application program 230 checks bin 1, bin 2, bin 0, bin 4, and bin 5 in this order to determine which bin that has the highest priority on the list is authorized and activated based on the AUTHORIZED field and the ACTIVE field in the subscriber's profile record. It is assumed that bin 1 has the highest priority and bin 5 has the lowest priority. Then, application program 230 retrieves the forward-to number in the first active bin on the list for call forwarding. For example, if bin 1 is inactive but bin 2 is active, then even if bins 0, 4, and 5 are active, the forward-to number in bin 2 will be used to for call forwarding.

Figure 1:
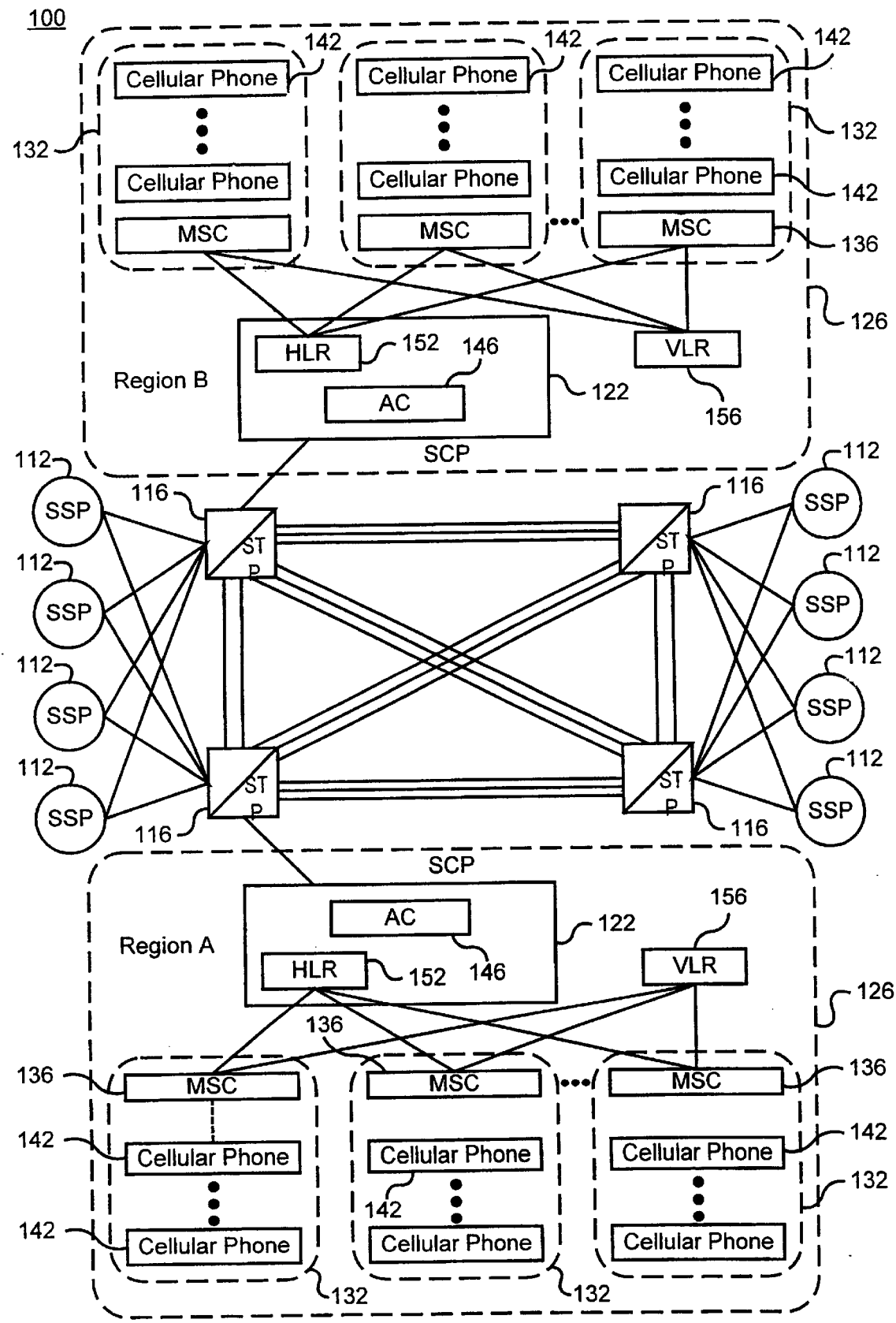
FIG. 1 depicts a typical SS7 mobile communication network.
Figure 9:
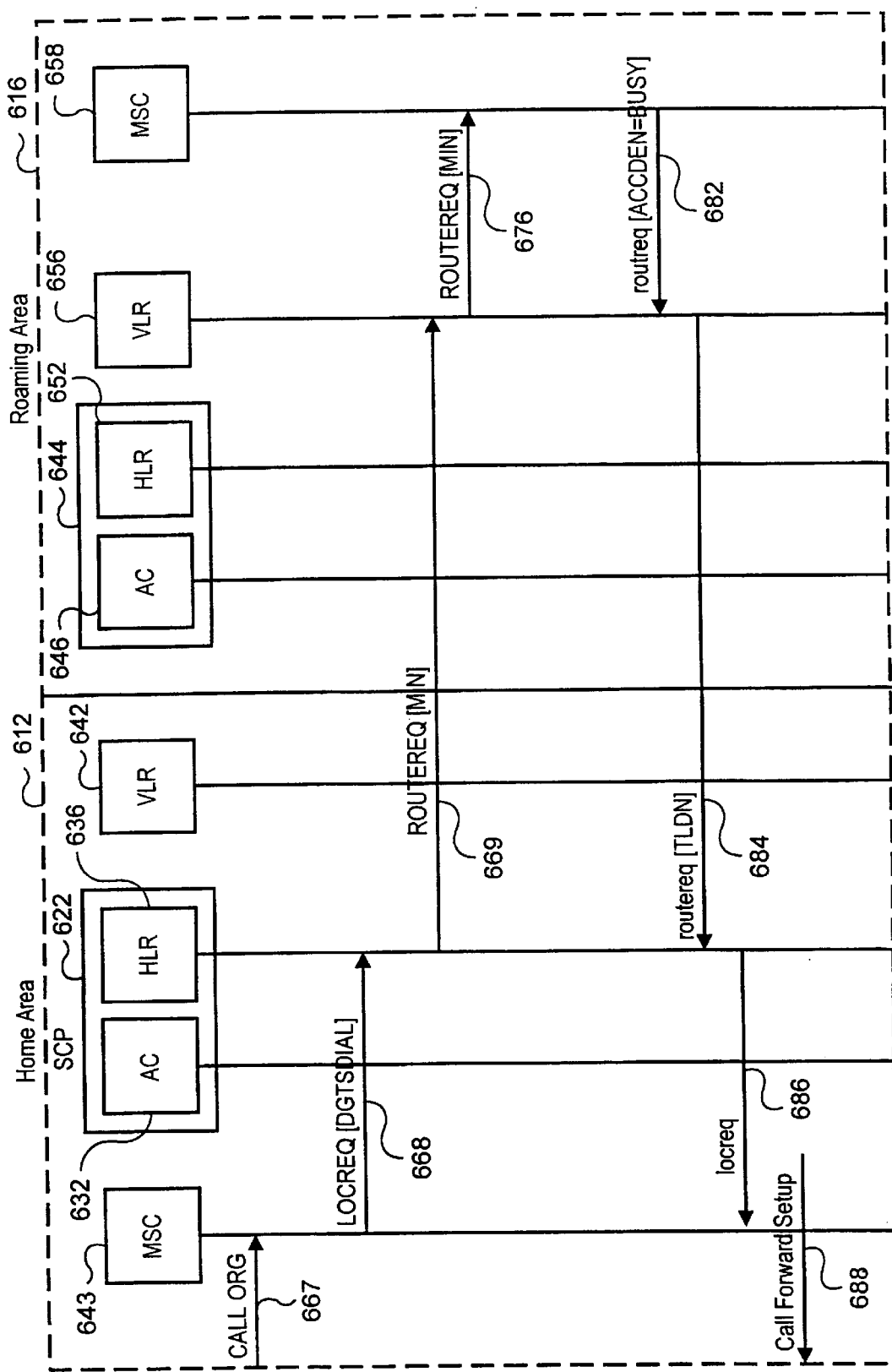
FIG. 9 shows a flow diagram illustrating call forwarding when the receiving party's cellular phone is outside its home area in a roaming area.

FIG. 9 illustrates how call delivery is made to a cellular phone that is outside its home area 612 in a roaming area 616. Home area 612 and roaming area 616 correspond to two regions, such as regions A and B, respectively, shown in FIG. 1. In home area 612, an SCP 622 includes an AC 632, a HLR 636, and a VLR 642. A home MSC 643 is located in home area 612. In roaming area 616, an SCP 644 includes an AC 646, a HLR 652 and a VLR 656. A serving MSC 658 is located in roaming area 616. In FIG. 9, although MSCs are shown as separate entities from the HLR and VLR in the respective areas, in a real application the HLR/VLR functions may be integrated with the MSCs.

As shown in FIG. 9 when a calling party places a call to a receiving party, a call origination and the dialed digits are received by home MSC 643 at step 667. MSC 643 is thus also referred to as originating MSC. Then, at step 668, originating MSC 643 sends a location request (LOCREQ) message to HLR 636 in home area 612 of the receiving party. The LOCREQ message contains the dialed digits, and other relevant information. Upon receiving the dialed digits, HLR 636 accesses its SUBS file using the received dialed digits (which is typically the MIN of a cellular phone) as the key to locate the receiving party's profile record.

If the receiving party is a legitimate subscriber, then step 669, HLR 636 sends a routing address request (ROUTREQ) message to VLR 656 in roaming area 616. The ROUTREQ message contains the MIN of the receiving party's cellular phone. VLR 656 then forwards the ROUTREQ message to serving MSC 658 at step 670. In response to the ROUTREQ message, serving MSC 658 consults its internal data structures to determine the status of the receiving party's cellular phone. The status of the cellular phone is returned to VLR 656 by serving MSC 658 via the ACCDEN (AccessDeniedReason) parameter in the routreq message at step 682. For example, if the cellular phone is busy, ACCDEN="BUSY" is returned to VLR 656 by serving MSC 658 in the routreq message at step 682. The MSCID of serving MSC 658 is also included in the routreq message. VLR 656 in turn sends the routreq message to HLR 636 at step 684. After having received the status of the cellular phone and the MSCID of serving MSC 658, application program 230 accesses the SYSP file of HLR 636 to locate a corresponding priority list. Next, application program 230 accesses the SUBS file of HLR 636 using the receiving party's MIN as key to locate the subscriber's profile record. From the profile record, application program 230 determines which bin that has the highest priority on the priority list is authorized and activated for this subscriber, based on the values in the AUTHORIZED field and the ACTIVE field in the BIN 1_INFO segment of the subscriber's profile record. Assume bin 1 is configured to implement CFB and the associated priority list is the roaming priority list shown in FIG. 8. Also, assume bin 1, i.e., the CFB bin is authorized and activated, application program 230 of HLR 636 sends a locreq response to originating MSC 643, providing the forwarding-to number retrieved from the FORWARD-TO_ NUMBER field in the CFB bin, along with other routing information such as the MSCID of serving MSC 658. In this example, if the CFB bin is not authorized or not activated for the receiving party, then application program 230 of HLR 636 will check bin 2 (i.e., the next bin on the priority list) in the receiving party's profile record to determine whether bin 2 is authorized and activated, and so on, until a bin that is authorized and activated is found. The forwarding-to number from the authorized and activated bin is retrieved and is provided in the locreq response to originating MSC 643 at step 686. Finally, originating MSC 643 establishes a call to the forward-to number specified in the locreq response, as illustrated at step 688.

Figure 10:
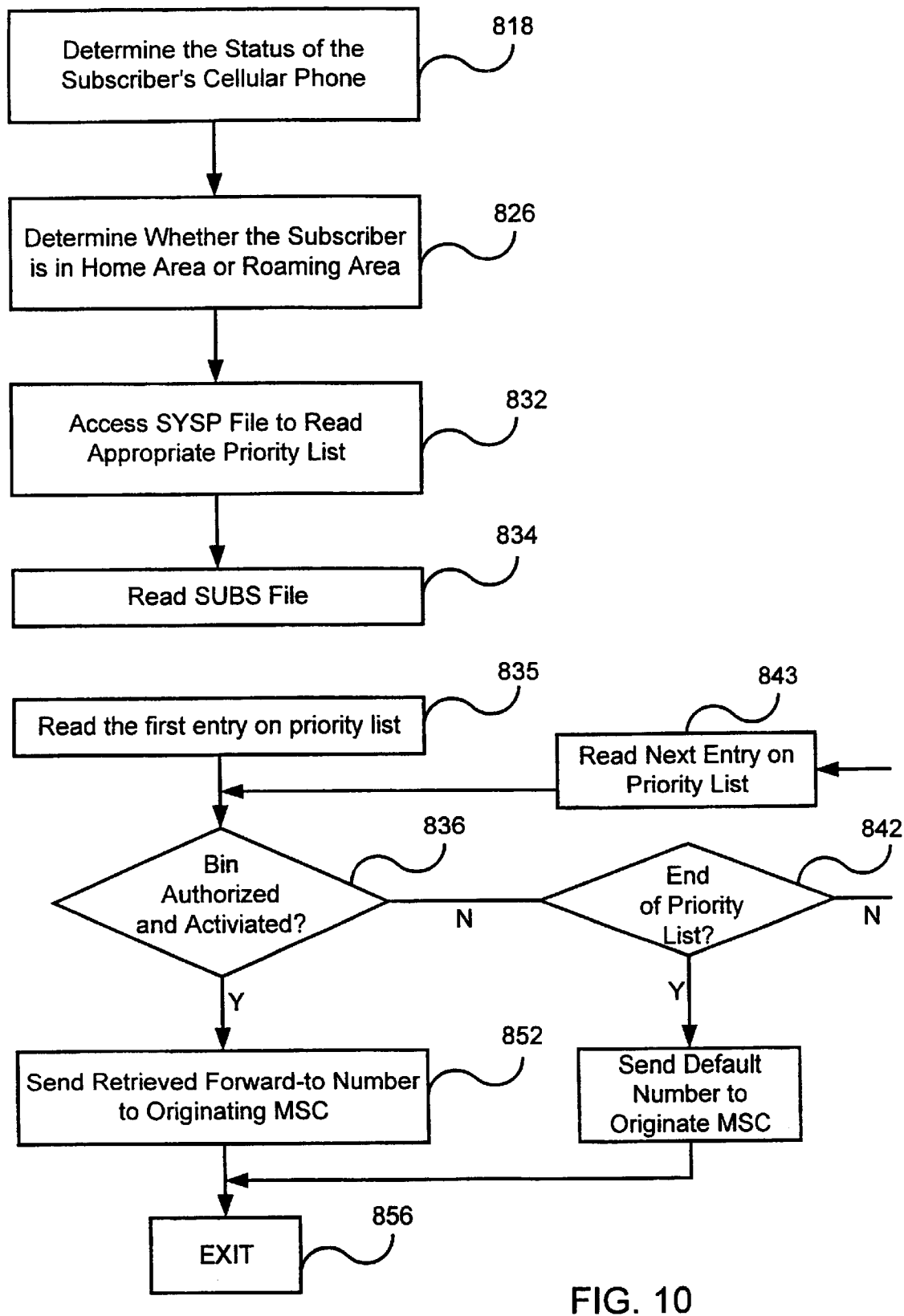
FIG. 10 shows a flow chart of the application program of an HLR for implementing configurable call forwarding bins of the invention.

FIG. 10 shows a flow chart illustrating the operation of application program 230 for call forwarding bins of an HLR according to the invention. The steps in FIG. 10 may be performed by HLR 636 of FIG. 9 although other HLRs are capable of performing these steps. At step 818, application program 230 determines the status a subscriber's cellular phone, i.e., whether it is busy, does not answer or is not registered or inactive, etc., from a routing message sent by an MSC currently serving the subscribers cellular phone. At step 826, the application program also determines, when the routing message is received, whether the subscriber is in the home area or a roaming area, based on the MSCID of the serving MSC in the subscriber profile record. Then, at step 832, application program 230 accesses the SYSP file of the HLR to read the appropriate priority list, based on whether the subscriber is in the home area or a roaming area and the status of the subscriber's cellular phone. Then, at step 834, application program 230 reads SUBS file using the MIN of the receiving party's cellular phone as key to locate the receiving party's profile record. Next, application program 230 reads the first bin entry on the priority list at step 835. From the profile record, application program 230 determines whether the first bin on the priority list is authorized and activated based on values in the AUTHORIZED field and the ACTIVE field in the appropriate BIN_INFO segment, as illustrated at step 836. If the bin is authorized and activated, then the forward-to number in this bin is retrieved and sent to originating MSC at step 852. On the other hand, if the bin is not authorized or is not activated, application program 230 determines whether there is another bin entry on the priority list at step 842. If so, application program 230 reads the next bin entry on the priority list at step 843. Application program 230 will again, at step 836, determine whether the next bin on the list is authorized and activated. If the next bin on the priority list is authorized and activated, application program 230 sends the forward-to number retrieved from this bin to the originating MSC for setting up the call forwarding. The program then exits at step 856.

If none of the bins on the priority list is determined to be authorized and activated, at step 846, application program 230 sends a switch default number to the originating MSC. This number is obtained from the SWITCH_DEFAULT_DN field in the MPCM file record associated with the serving MSC. In such a case, an announcement, e.g., "The number you have dialed is not longer in service" will be played to the calling party. The program exits at step 856.

Accordingly, by using the improved HLR of the invention, more features are available to both the cellular carrier and subscribers.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method of implementing call forwarding bins configurable to implement preselected call forwarding features in a mobile telephone system, each call forwarding bin storing a forward-to number, the method comprising the steps of:
    (a) receiving a status of a subscriber's cellular phone;
    (b) determining the status of the cellular phone and whether the cellular phone is in a home area or a roaming area;
    (c) checking a pre-defined priority list associated with the status of the cellular phone and whether the cellular phone is in a home area or a roaming area, the priority list identifying a plurality of call forwarding bins each assigned with a predetermined priority and each containing a forward-to phone number;
    (d) providing control of the subscriber's ability to activate and deactivate any of the plurality of call forwarding bins identified in the priority list;
    (d) determining which call forwarding bin on the priority list has the highest priority, is activated, and is available to the subscriber;
    (e) retrieving a forward-to phone number from the call forwarding bin that has the highest priority on the priority list, is activated, and is available to the subscriber; and
    (f) redirecting an incoming call destined for the subscriber's cellular phone to the forward-to phone number.

2. The method of claim 1, wherein each call forwarding bin is available to the subscriber if the bin is authorized by a cellular carrier and is activated.

3. The method of claim 1, further comprising the step of providing control of the subscriber's ability to modify any one of the forward-to phone numbers in the plurality of call forwarding bins.

4. A home location register (HLR) for implementing call forwarding bins configurable to implement preselected call forwarding features in a mobile telephone system, each call forwarding bin storing a forward-to number, the HLR comprising:
    a first portion configured to receive a status of a subscriber's cellular phone;
    a second portion configured to determine the status of the cellular phone and whether the subscriber's cellular phone is in a home area or a roaming area;
    a third portion configured to check a pre-defined priority list associated with the status of the cellular phone and whether the subscriber's cellular phone is in a home area or a roaming area, the priority list identifying the call forwarding bins;
    a fourth portion configured to provide control of the subscriber's ability to activate and deactivate any of the call forwarding bins;
    a fifth portion configured to determine which bin on the priority list has the highest priority, is activated, and is available to the subscriber;
    a sixth portion configured to retrieve a forward-to number from the bin that has the highest priority on the priority list, is activated, and is available to the subscriber; and
    a seventh portion configured to redirect an incoming call destined for the subscriber's cellular phone to the forward-to number.

5. The HLR of claim 4, wherein each call forwarding bin is available to the subscriber if the bin is authorized by a cellular carrier and is activated.

6. The HLR of claim 4, further comprising an eighth portion configured to provide control of the subscriber's ability to modify forward-to numbers in the call forwarding bins.

7. A call forwarding bin configurable for implementing a predetermined call forwarding feature for a subscriber's cellular phone, comprising:
    an authorized flag for providing authorization of the bin to a subscriber;
    an active flag for activating and deactivating the bin;
    a forward-to number flag for providing a forward-to number for redirecting an incoming call destined to the subscriber's cellular phone when the bin is authorized and activated and is selected for call forwarding; and
    a lock flag for controlling the subscriber's ability to modify the active flag that allows the subscriber to activate and deactivate the bin and for controlling the subscriber's ability to modify the forward-to number associated with the bin.

8. A computer program product comprising:
    a computer usable medium having computer readable code embodied therein for implementing call forwarding bins configurable to implement preselected call forwarding features in a mobile telephone system, each call forwarding bin storing a forward-to number, the computer program product comprising:
        computer readable program code devices configured to cause a computer to effect receiving a status of a subscriber's cellular phone;

computer readable program code devices configured to cause a computer to effect determining the status of the cellular phone and whether the subscriber's cellular phone is in a home area or a roaming area;

computer readable program code devices configured to cause a computer to effect checking a pre-defined priority list associated with the status of the cellular phone and whether the subscriber's cellular phone is in a home area or a roaming area, the priority list identifying a plurality of call forwarding bins each assigned with a predetermined priority;

computer readable program code devices configured to cause a computer to effect determining which bin on the priority list has the highest priority and is available to the subscriber;

computer readable program code devices configured to cause a computer to effect retrieving a forward-to number from the bin that has the highest priority on the priority list and is available to the subscriber;

computer readable program code devices configured to cause a computer to effect redirecting an incoming call destined for the subscriber's cellular phone to the forward-to number; and computer readable program code devices configured to cause a computer to effect providing control of the subscriber's ability to activate and deactivate predetermined call forwarding bins.

9. The computer program product of claim 8, wherein each call forwarding bin is available to the subscriber if the bin is authorized by a cellular carrier and is activated.

10. The computer program product of claim 9, further comprising computer readable program code devices configured to cause a computer to effect providing control of the subscriber's ability to modify forward-to numbers in predetermined call forwarding bins.

11. The computer program product of claim 9, further comprising computer readable program code devices configured to cause a computer to effect providing control of the subscriber's ability to modify forward-to numbers in predetermined call forwarding bins.

* * * * *